Patented Apr. 17, 1923.

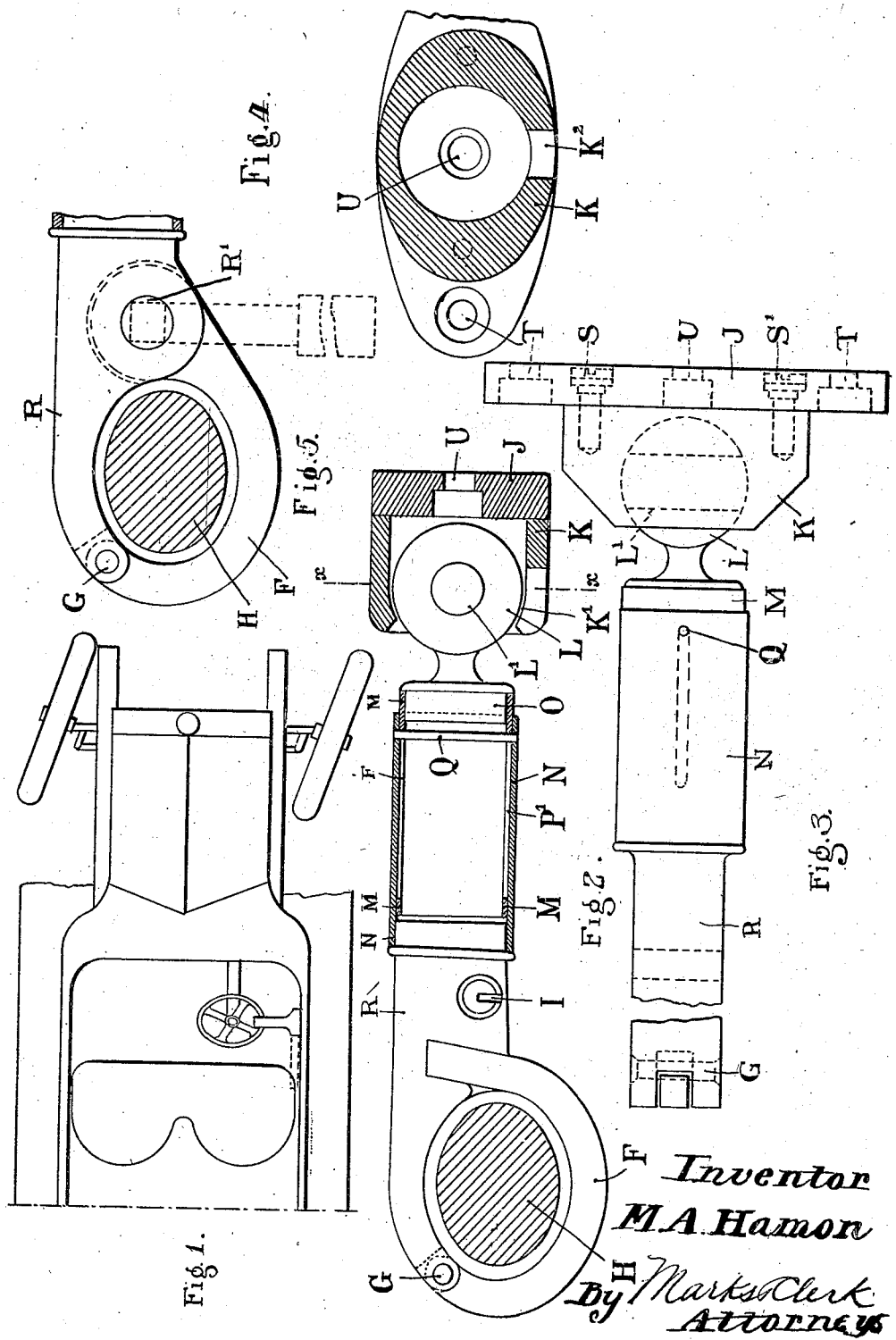

1,452,240

UNITED STATES PATENT OFFICE.

MARIUS ANDRÉ HAMON, OF PARIS, FRANCE.

APPARTAUS FOR PREVENTING THE STEALING OF MOTOR CARS.

Application filed October 6, 1920. Serial No. 415,164.

*To all whom it may concern:*

Be it known that I, MARIUS ANDRÉ HAMON, a citizen of the French Republic, residing at Paris, France, 167 Boulevard Pereire, Paris, have invented certain new and useful Improvements in Apparatus for Preventing the Stealing of Motor Cars, of which the following is a specification.

This invention relates to apparatus for locking the steering wheel of a motor-car for preventing the stealing of the car.

Such apparatus as previously proposed leave exposed the means for fixing them to the body of the car both when they are in the engaged and in the disengaged position.

The object of the present invention is to provide an apparatus as aforementioned which will conceal the means for fixing it to the body of the car when it is in its engaged position.

The improved apparatus is illustrated by way of example in the accompanying drawings in which:—

Fig. 1 is a view showing the application of the apparatus to a motor car.

Figs. 2 and 3 are respectively an elevation partly in section and a plan of the apparatus.

Fig. 4 is a section on the line X—X of Fig. 2.

Fig. 5 is a modification of the locking device as shown in the drawings the improved apparatus comprises a base plate J which is fixed to the car body, to this plate is fixed a hollow block K, the front portion of which forms a hemispherical cup $K^1$, from which the top has been removed.

In this block there is engaged a spherical member L with which the arm of the improved apparatus terminates. The hemispherical cup and the spherical member have substantially the same diameter and form a ball and socket joint. The aperture of the cup $K^1$ is sufficient to enable the improved apparatus to assume all necessary positions, whilst the spherical member L is incapable of becoming disengaged from the cup.

The arm is preferably composed of two tubes M and N sliding with gentle friction one within the other. The inner tube M is brazed or fixed by any suitable means on a plug O fixed to the spherical member L.

This tube M has two longitudinal apertures P and $P^1$ located in one and the same diameter and extending longitudinally over almost the whole length of the tube M.

The outer tube N is provided at its inner end with a transverse pin Q which extends through the apertures P and $P^1$ of the inner tube M. This pin is firmly riveted at its two ends upon the tube N. The two tubes are therefore capable of sliding one along the other for a certain length whilst remaining connected together, so that the length of the arm can be varied according to requirement.

This tube N has fixed to its end a member R which is terminated by a hooked member comprising a movable part F pivoted thereto at G. This movable part F is adapted to completely encircle the rim H of the steering wheel and is adapted to engage with the lower end of the member R upon which is provided a lock I, the bolt of which is adapted to secure the movable part F in the engaging position.

Owing to the ball and socket joint the apparatus can fit any steering wheel at whatever angle it may be set, also the extensible arm permits the apparatus to be fitted to cars which have their steering wheels arranged at different distances from the body.

In the modification illustrated in Fig. 5, the lock is replaced by a more simple device. The part F terminates in an eye which, in the closed position, is adapted to engage in a recess formed in the corresponding portion of the part R. Apertures $R^1$ formed in the part R allow of locking the part F by means of a padlock.

The block K is fixed to the plate J by means of the screws S which, when the apparatus is in position, are concealed and thus beyond the reach of tampering. The plate J is fixed to the car body by means of bolts sunk in the latter and extending through the apertures T. Further, another bolt, likewise sunk in the car body, extends through the aperture U. To fix the nut upon the screw-threaded shank of this bolt, recourse is had to the following construction: The spherical member L is pierced from side to side along a diameter with an aperture $L^1$. When the apparatus is in the position of rest, this aperture can be brought opposite the aperture U, whereupon the nut can be readily placed in position. The block K is formed with a notch $K^2$ so that the apparatus may hang vertically and thus allow of the aperture $L^1$ being correctly positioned.

It will be understood that when the apparatus is placed upon the steering wheel, the aperture L¹ is no longer opposite the aperture U, and therefore it is impossible to remove the apparatus when it is in this position.

The drawings illustrate the apparatus resting upon the steering wheel. It may also be located below the latter, in which case the part F would extend above the steering wheel. Similarly, the apparatus instead of encircling the rim of the steering wheel, may encircle a spoke of the latter, in which case its shape would have to be modified.

It is to be understood that the shape of the end of the improved apparatus designed to lock the steering wheel, has been shown solely by way of example. It may more particularly, comprise two joints for rendering its placing in position more easy in certain cases. The end of the part F may also be arranged to enter a suitable recess in which it would be locked by the lock I unless it is preferred to adopt the construction shown in Fig. 7.

It is to be noted that the improved apparatus being permanently mounted on the car, is always within reach of the driver, and that it can be placed immediately in position without any risk of the driver getting dirty, and also when once it is in position, it cannot be removed by fraud.

What I claim is:—

In an apparatus for locking the steering wheel of a motor car for preventing the stealing of the car, comprising a base member adapted to be fixed to the car body and provided with a hemispherical cup, an extensible arm having a spherical member at one end adapted to fit into said cup to form a ball and socket joint, a hooked member pivotally connected to the free end of said arm, a locking device adapted to lock the said hooked member upon the said steering wheel, and fixing means for attaching the base member to the car body, the arrangement whereby the fixing means is concealed or exposed respectively when the arm is engaged with or disengaged from the steering wheel comprising a transverse aperture through the said ball such aperture when the arm is in its disengaged position being adapted to allow the fixing means to be placed in position or removed.

In testimony whereof I have signed my name to this specification.

MARIUS ANDRÉ HAMON.